United States Patent
Yadhunandan et al.

(10) Patent No.: US 10,121,084 B2
(45) Date of Patent: Nov. 6, 2018

(54) METHOD AND A SYSTEM FOR DETECTING DROWSINESS STATE OF A VEHICLE USER

(71) Applicant: WIPRO LIMITED, Bangalore (IN)

(72) Inventors: Ullam Subbaraya Yadhunandan, Bangalore (IN); Ankita Kalra, Lucknow (IN); Rahul Jain, Jaipur (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/463,455

(22) Filed: Mar. 20, 2017

(65) Prior Publication Data

US 2018/0260641 A1    Sep. 13, 2018

(30) Foreign Application Priority Data

Mar. 7, 2017    (IN) .............................. 201741008017

(51) Int. Cl.
*G06K 9/00* (2006.01)
(52) U.S. Cl.
CPC ....... *G06K 9/00845* (2013.01); *G06K 9/0061* (2013.01); *G06K 9/00281* (2013.01)
(58) Field of Classification Search
None
See application file for complete search history.

(56) References Cited

U.S. PATENT DOCUMENTS

| | | | | |
|---|---|---|---|---|
| 2004/0090334 A1* | 5/2004 | Zhang | ................. | B60K 28/066 340/575 |
| 2006/0188130 A1* | 8/2006 | Park | ................. | G06K 9/00248 382/103 |
| 2011/0205350 A1* | 8/2011 | Terashima | ......... | G06K 9/00597 348/78 |
| 2013/0010096 A1* | 1/2013 | S. | .......................... | A61B 3/113 348/78 |
| 2013/0169754 A1* | 7/2013 | Aronsson | ........... | H04N 5/23212 348/46 |

(Continued)

OTHER PUBLICATIONS

Chisty, J.G. et al., "A review: Driver Drowsiness Detection System", International Journal of Computer Science Trends and Technology (IJCST), vol. 3, Issue 4, pp. 243-252 (2015).

(Continued)

*Primary Examiner* — Delomia L Gilliard
(74) *Attorney, Agent, or Firm* — Finnegan, Henderson, Farabow, Garrett & Dunner LLP

(57) ABSTRACT

Disclosed subject matter relates generally to image processing that includes a method for detecting drowsiness state of a vehicle user independent of factors such ethnicities, gender and other differences of an individual. A drowsiness detection system receives current images of the vehicle user from an image capturing device in a current time frame. Further, an eye closure ratio of the vehicle user is determined in the current time frame using eye closure parameters extracted from the current images in real-time and a profile of the vehicle user. Further, the eye closure ratio is normalized using a scaling factor computed in real-time using normalizing parameters extracted from the current images in real-time and the profile. Finally, a Percentage Eye Closure (PEC) value of the vehicle user is determined in the current time frame using the normalized eye closure ratio of the vehicle to detect drowsiness state of the vehicle user.

20 Claims, 5 Drawing Sheets

(56) References Cited

U.S. PATENT DOCUMENTS

2014/0098232 A1* 4/2014 Koike ................ G06K 9/00369
   348/148
2017/0345276 A1* 11/2017 Stoltz .................... G08B 21/06

OTHER PUBLICATIONS

Dwivedi, K. et al., "Drowsy Driver Detection using Representation Learning", *IEEE International Advance Computing Conference*, pp. 995-999 (2014).

* cited by examiner

METHOD AND A SYSTEM FOR DETECTING DROWSINESS STATE OF A VEHICLE USER

TECHNICAL

The present subject matter relates generally to video analytics, and more particularly, but not exclusively to a method and a system for detecting drowsiness state of a vehicle user.

BACKGROUND

Nowadays, in transportation industry, most of the transportation such as passenger transportation, goods transportation and the like happens via road transport system. However, drivers of such transportation vehicles may feel drowsy due to reasons such as fatigue, lack of sleep, medication and the like. Drowsiness of the drivers is considered as one of the main reasons for major road accidents. The road accidents lead to heavy operating losses for the transportation industry.

Currently, there exist many systems to detect drowsiness and fatigue in the transportation vehicles. These systems may work based on face image detection, calculating eye lid closure, detecting position of eyes, detecting position of head and the like. Some of the existing techniques for detecting drowsiness may be based on human physiological phenomena. These techniques may be implemented in two ways, in which one way includes measuring changes in physiological signals of the driver such as brain waves, heart rate, eye blinking and the like. Another way may include measuring physical changes such as sagging posture of the driver, leaning of the driver's head, open and close states of eyes of the driver and the like. Though these techniques may provide accurate results, it may not be realistic since sensing electrodes may have to be attached directly onto the driver's body for the working of these techniques. Attaching sensing electrodes to the driver's body may annoy and distract the driver. Further, attaching sensing electrodes to the driver's body for a long time results in perspiration on the sensors that eventually diminishes their ability to monitor accurately.

Some other existing techniques monitor vehicle behavior based on steering wheel movement, accelerator, brake patterns, vehicle speed, lateral acceleration, lateral displacement and the like. However, these techniques of drowsiness detection are limited to vehicle type and driver conditions. The existing techniques can avoid the road accidents to some extent by alerting the driver in critical conditions. However, these techniques may not be able to perform efficiently in varying vehicle driving conditions like different speeds and off-road conditions, varying lighting intensities on the road and the like that complicate monitoring process of various states of eyes due to random movement of the driver towards and away from these systems installed in the vehicle under these conditions. Due to inefficient performance under the above mentioned conditions, these existing systems may provide false alarms that makes the driver uncomfortable.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for detecting drowsiness state of a vehicle user. The method comprises receiving, by a drowsiness detection system, one or more current images of the vehicle user from an image capturing device associated with the drowsiness detection system in a current time frame. Upon receiving the one or more current images, the drowsiness detection system determines an eye closure ratio of the vehicle user in the current time frame using one or more eye closure parameters extracted from the one or current images in real-time and a profile of the vehicle user received from a user profile database. The user profile database is associated with the drowsiness detection system. Further, the drowsiness detection system normalizes the eye closure ratio using a scaling factor computed in real-time. The scaling factor is computed using one or more normalizing parameters extracted from the one or more current images in real-time and the profile of the vehicle user. Furthermore, the drowsiness detection system determines a Percentage Eye Closure (PEC) value of the vehicle user in the current time frame using the normalized eye closure ratio of the vehicle user. Finally, the drowsiness detection system compares the PEC value of the current time frame and PEC values of each of plurality of previous time frames with a predefined threshold to detect drowsiness state of the vehicle user.

Further, the present disclosure includes drowsiness detection system for detecting drowsiness state of a vehicle user. The drowsiness detection system comprises a processor and a memory communicatively coupled to the processor. The memory stores the processor-executable instructions, which, on execution, causes the processor to receive one or more current images of the vehicle user from an image capturing device associated with the drowsiness detection system in a current time frame. Upon receiving the one or more current images, the processor determines an eye closure ratio of the vehicle user in the current time frame using one or more eye closure parameters extracted from the one or more current images in real-time and a profile of the vehicle user received from a user profile database. The user profile database is associated with the drowsiness detection system. Further, the processor normalizes the eye closure ratio using a scaling factor computed in real-time. The scaling factor is computed using one or more normalizing parameters extracted from the one or more current images in real-time and the profile of the vehicle user. Furthermore, the processor determines a Percentage Eye closure (PEC) value of the vehicle user in the current time frame using the normalized eye closure ratio of the vehicle user. Finally, the processor compares the PEC value of the current time frame and PEC values of each of plurality of previous time frames with a predefined threshold to detect drowsiness state of the vehicle user.

Further, the present disclosure comprises a non-transitory computer readable medium including instructions stored thereon that when processed by at least one processor causes an drowsiness detection system to perform operations comprising receiving one or more current images of the vehicle user from an image capturing device associated with the drowsiness detection system in a current time frame. Upon receiving the one or more current images, the instructions cause the processor to determining an eye closure ratio of the vehicle user in the current time frame using one or more eye closure parameters extracted from the one or more current images in real-time and a profile of the vehicle user received from a user profile database associated with the drowsiness detection system. Further, the instructions cause the processor to normalizing the eye closure ratio using a scaling factor computed in real-time. The scaling factor is computed using one or more normalizing parameters extracted from the one or more current images in real-time and the profile of the vehicle user. Furthermore, the instructions cause the processor to determining a Percentage Eye Closure (PEC) value of the vehicle user in the current time frame using the normalized eye closure ratio of the Vehicle user. Finally, the instructions cause the processor to compare the PEC value of the current time frame and PEC values of plurality of previous time frames with a predefined threshold to detect drowsiness state of the vehicle user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
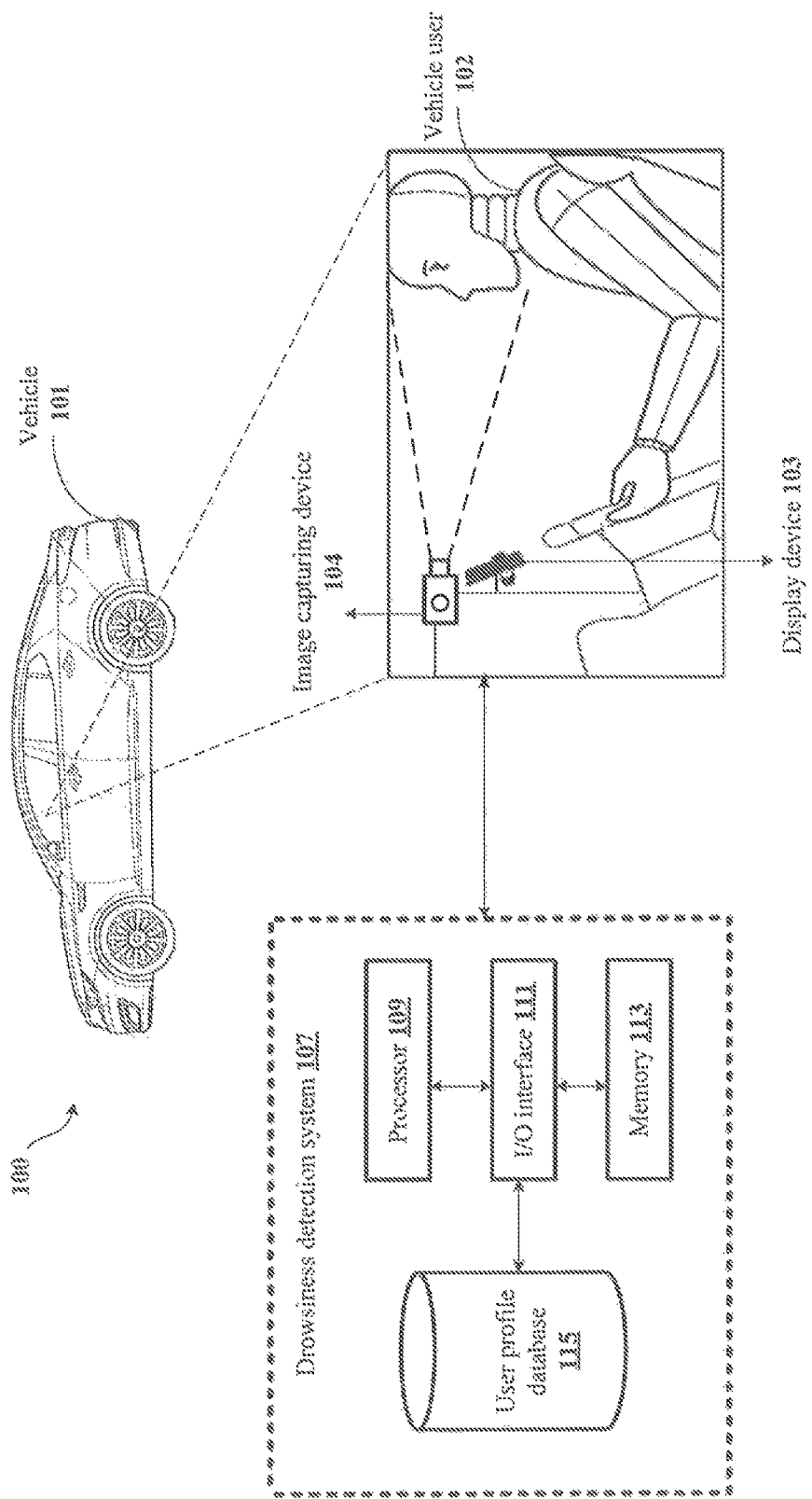
FIG. 1 shows an exemplary architecture far detecting drowsiness state of a vehicle user in accordance with some embodiments of the present disclosure.

It should be appreciated those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by"comprises . . . a" does not, without more constraints, preclude the existence of other elements or additional elements in the system or method.

Disclosed herein is a method for detecting drowsiness state of a vehicle user. The method comprises receiving, by a drowsiness detection system, one or more current images of the vehicle user from an image capturing device associated with the drowsiness detection system in a current time frame. Upon receiving the one or more current images, the drowsiness detection system determines an eye closure ratio of the vehicle user in the current time frame using one or more eye closure parameters extracted from the one or more current images in real-time and a profile of the vehicle user received from a user profile database. The present disclosure provides a feature wherein once the profile of the vehicle user is created, the drowsiness detection system recognizes the vehicle user and retrieves the profile from the user profile database whenever the vehicle user uses the vehicle. Therefore, freshly recording eye and face parameters of the vehicle user for creating the profile is not required whenever the vehicle user uses the vehicle. Further, the present disclosure provides a feature wherein the eye closure ratio is detected based on the eye parameters and the face parameters that are computed for each vehicle user that eliminates dependency on factors such as ethnicity of the vehicle user, gender of the vehicle user and other differences that may occur from one individual to another. Further, the drowsiness detection system normalizes the eye closure ratio using a scaling factor computed in real-time. The scaling factor is computed using one or more normalizing parameters extracted from the one or more current images in real-time and the profile of the vehicle user. Normalization eliminates one or more errors that occur while determining the eye closure ratio due to movement of the vehicle user while driving the vehicle are eliminated by a normalization process. Furthermore, the drowsiness detection system determines a Percentage Eye Closure (PEC) value of the vehicle user in the current time frame using the normalized eye closure ratio of the vehicle user. Finally, the drowsiness detection system compares the PEC value of the current time frame and PEC values of each plurality of previous time frames with a predefined threshold to detect drowsiness state of the vehicle user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for detecting drowsiness state of a vehicle user in accordance with some embodiments of the present disclosure.

The architecture 100 includes a vehicle 101, a vehicle user 102, a display device 103 and an image capturing device 104 and a drowsiness detection system 107. A vehicle 101 is configured with the image capturing device 104 and the display device 103. As an example, the vehicle 101 may include, but not limited to, a car, a bus, a lorry, a rickshaw and the like. The image capturing device 104 is associated with the display device 103. As an example, the image capturing device 104 may be a camera, a mobile, a tablet and the like. The image capturing device 104 may capture one or more images of the vehicle user 102 and display on the display device 103 in real-time. Further the image capturing device 104 may capture video of the vehicle user 102 and display the video on the display device 103 in real-time. As an example, the display device 103 may be an infotainment screen, a windscreen and the like. In some embodiments, the image capturing device 104 and the display device 103 may be present in a single device such as the mobile, the tablet and the like. Further, the image capturing device 104 and the display device 103 are associated with the drowsiness detection system 107. In some embodiments, the drowsiness detection system 107 may be configured in the vehicle 101 along with the image capturing device 104 and the display device 103. In some embodiments, the drowsiness detection system 107 may be present in a remote location The drowsiness detection system 107 interacts with the image capturing device 104 and the display device 103 via a communication network (not shown in the FIG. 1). The communication network may be at least one of a wired communication network and a wireless communication network.

The drowsiness detection system 107 includes a processor 109, an I/O interface 111, a memory 113 and a user profile database 115. The interface 111 receives one or more current images of the vehicle user 102 in a current time frame from the image capturing device 104. The one or more current images may be related to eyes and face of the vehicle user 102. The processor 109 extracts one or more eye closure parameters from the one or more current images in real-time. As an example, the one or more eye closure parameters may include, but not limited to, a distance between upper eye lash and eyebrow of the vehicle user 102 in the current time frame and distance between lower eye lash and the eyebrow of the vehicle user 102 in the current time frame. Further, the processor 109 determines one or more normalization parameters from the one or more current images in real-time. As an example, the one or more normalization parameters may include, but not limited to, width of the face in the current time frame, height of the face in the current time frame and distance between the face and the image capturing device 104 in the current time frame. The processor 109 determines an eye closure ratio of the vehicle user 102 in the current time frame using the one or more eye closure parameters and a profile of the vehicle user 102. The eye closure ratio indicates ratio of eye closure of the vehicle user 102 in the current time frame with eye closure of the vehicle user 102 retrieved from the user profile database 115 at a state when the eye is completely closed. In some embodiments, the profile of the vehicle user 102 is received from the user profile database 115. In some embodiments, the user profile database 115 may be present within the drowsiness detection system 107 or may be externally associated with the drowsiness detection system 107. Further, the processor 109 normalizes the eye closure ratio using a scaling factor that is computed in real-time. In some embodiments, the scaling factor in the current time frame is computed using the one or more normalization parameters and the profile of the vehicle user 102. Upon normalizing the eye closure ratio, the processor 109 determines a Percentage Eye Closure (PEC) value of the vehicle user 102 in the current time frame using the normalized eye closure ratio. Similarly, by reiterating the above process of determining the eye closure ratio, normalizing the eye closure, ratio and determining the PEC value, the processor 109 may have determined a PEC value for each of one or more previous time frames and stored in the memory 113. The processor 109 compares the PEC value of the current time frame and the PEC value of the one or more previous time frames with a predefined threshold related to the PEC. Based o the comparison, the processor 109 detects drowsiness state of the vehicle user 102. The processor 109 continues the process of detecting the drowsiness state of the vehicle user 102 until the vehicle user 102 or any external force voluntarily stops the process. The processor 109 notifies to one or more end users, the drowsiness state of the vehicle user 102. As an example, the notification may be in the form of an alarm, a message, a visual indication, a haptic indication and the like.

In one embodiment, the drowsiness detection system 107 may be implemented in the form of an Electronic Control Unit (ECU) of the vehicle 101. In one embodiment, the drowsiness detection system 107 may be located external to the vehicle 101.

Figure 2A:
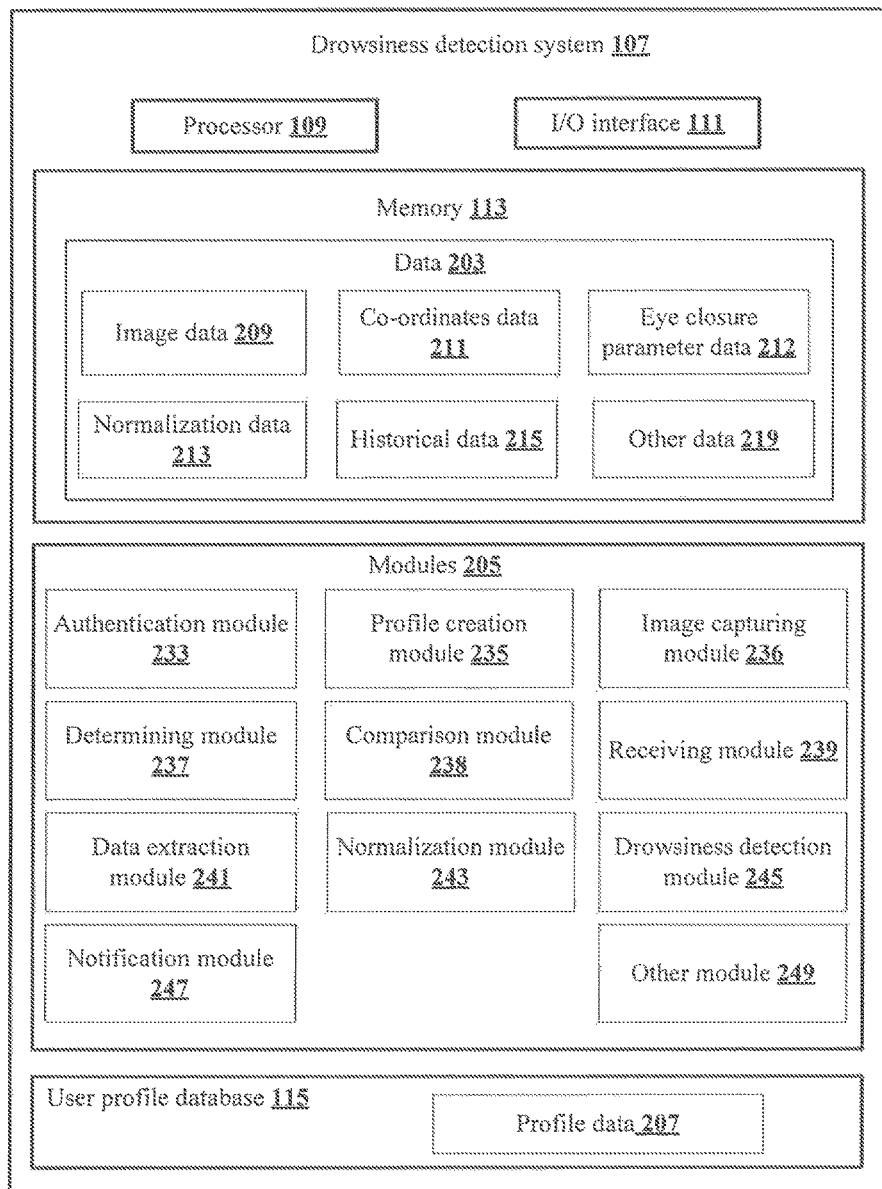
FIG. 2A shows a detailed block diagram of a drowsiness detection system for detecting drowsiness state of a vehicle user in accordance with sonic embodiments of the present disclosure.

FIG. 2A shows a detailed block diagram of a drowsiness detection system for detecting drowsiness state of a vehicle user in accordance with some embodiments of the present disclosure.

In some implementations, the drowsiness detection system 107 includes data 203. As an example, the data 203 is stored in the memory 113 configured in the drowsiness detection system 107 as shown in the FIG. 2A. In one embodiment, the data 203 includes an image data 209, a co-ordinates data 211, an eye closure parameter data 212, a normalization data 213, a historical data 215 and other data 219, in the illustrated FIG. 2A, modules 205 are described herein in detail. Further, a user profile database 115 is associated with the drowsiness detection system 107 including a profile data 207.

In some embodiments, the data 203 may be stored in the memory 113 in form of various data structures. Additionally, the data 203 can be organized using data models, such relational or hierarchical data models. The other data 219 may store data, including temporary data, configuration files and temporary files, generated by the modules 205 for performing the various functions of the drowsiness detection system 107.

In some embodiments, the data 203 stored in the memory 113 is processed by the modules 205 of the drowsiness detection system 107. The modules 205 may be stored within the memory 113. In an example, the modules 205 communicatively coupled to a processor 109 configured in the drowsiness detection system 107, may also be present outside the memory 113 as shown in FIG. 2A and implemented as hardware. As used herein, the term modules refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, an authentication module 233, a profile creation module 235, an image capturing module 236, a determining module 237, a comparison module 238 a receiving module 239, a data extraction module 241, a normalization module 243, a drowsiness detection module 245, a notification module 247 and other modules 249. The other modules 249 may be used to perform various miscellaneous functionalities of the drowsiness detection system 107. It will be appreciated that such aforementioned modules 205 may be represented as a single module or a combination of different modules.

In some embodiments, the authentication module 233 may authenticate a vehicle user 102 when the vehicle user 102 enters the vehicle 101. In some embodiments, the drowsiness detection system 107 may met activated automatically when the vehicle user 102 enters the vehicle 101 based on one or more sensors associated with the drowsiness detection system 107. In some embodiments, the drowsiness detection system 107 may get activated by the ignition of the vehicle 101. In some embodiments, the drowsiness detection system 107 may be manually activated by the vehicle user 102 entering into the vehicle 101. Upon activation of the drowsiness detection system 107, the authentication module 233 may display a message on a display device 103 associated with the drowsiness detection system 107 to the vehicle user 102. As an example, the display device 103 may be an infotainment screen, a windscreen and the like. As an example, the message may indicate the vehicle user 102 to occupy seat of the vehicle 101 in a manner that eyes and face of the vehicle user 102 lie within a field of view of an image capturing device 104 associated with the drowsiness detection system 107. Upon occupying the seat by the vehicle user 102, the authentication module 233 analyses the face of the vehicle user 102 using one or more predefined face recognition techniques. Further, if the authentication module 233 detects the vehicle user 102, the vehicle user 102 is considered as a true user of the vehicle 101. Further, a profile of the vehicle user 102 is retrieved from the user profile database 115. If the authentication module 233 fails to detect the vehicle user 102, the vehicle user 102 is considered as a new user. The authentication module 233 indicates the vehicle user 102 that authentication was not successful and activates the profile creation module 235 to create a profile of the vehicle user 102.

In some embodiments, the profile creation module 235 may create the profile of the vehicle user 102. The profile creation module 235 fits a predefined appearance model on the display device 103 to the eyes and the face of the vehicle user 102 when the vehicle user 102 is in a stationary position. Upon fitting the appearance model, the profile creation module 235 provides instructions to the vehicle user 102 to blink eyes. As an example, the profile creation module 235 may request the vehicle user 102 to blink eyes twice. Further, the image capturing module 236 captures one or more images of the eyes and the face of the vehicle user 102 using the image capturing device 104 when the vehicle user 102 follows the instructions of blinking eyes. The one or more images capture each of one or more open and close states of the eyes. The one or more images are stored as the image data 209. Upon capturing the one or more images, the profile creation module 235 extracts plurality of eye parameters and plurality of face parameters from the one or more images. As an example, the plurality of eye parameters may include, but not limited to, average height of the eye, average width of the eye, maximum distance between upper eye lash and eyebrow of the vehicle user 102 and minimum distance between upper eye lash and eyebrow of the vehicle user 102. As an example, the plurality of face parameters may include, but not limited to, average height of the face, average width of the face and location of the eye on the face, distance of the face from the image capturing device 104. The profile creation module 235 may create the profile of the vehicle user 102 comprising the plurality of eye parameters and the plurality of face parameters. An exemplary profile of the vehicle user 102 may be as shown in the below Table 1.

TABLE 1

EXEMPLARY PROFILE 1:
VEHICLE USER 102

| SL. NO | EYE PARAMETERS | | SL. NO | FACE PARAMETERS | |
|---|---|---|---|---|---|
| 1. | Average height of the eye | 50 pixels | 1. | Average height of the face | 1250 pixels |
| 2. | Average width of the eye | 223 pixels | 2. | Average width of the face | 950 pixels |
| 3. | Maximum distance between upper eye lash and eyebrow | 48.0652 pixels | 3. | Distance of the face from the image capturing device | 30 inches |
| 4. | Maximum distance between upper eye lash and eyebrow | 35.4187 pixels | | | |

Further, the profile creation module 235 stores the profile of the vehicle user 102 as the profile data 207 in the user profile database 115. In some embodiments, the user profile database 115 may be present within the drowsiness detection system 107 or may be externally associated with the drowsiness detection system 107. When the profile of the vehicle user 102 is created, the authentication module 233 retrieves the profile of the vehicle 102 and activates the determining module 237. The vehicle user 102 may be driving the vehicle 101 upon authentication or may have started driving the vehicle 101 before authentication is completed.

In some embodiments, the determining module 237 may determine an eye closure ratio of the vehicle user 102. The eye closure ratio indicates ratio of eye closure of the vehicle user 102 in the current time frame with eye closure of the vehicle user 102 retrieved from the user profile database 115 at a state when the eye is completely closed. Initially, the determining module 237 may fit the predefined appearance model on the display device 103 to the eyes and the face of the vehicle user 102 in the current time frame. In an embodiment, the predefined eye appearance model is fitted in each time frame. The determining module 237 may determine location points representing eyes of the vehicle user 102. In an embodiment, the location points are determined in terms of co-ordinates. The comparison module 238 may compare the location points in the current time frame with location points determined in a plurality of previous time frames. The location points of the eyes of the vehicle user 102 are stored as the co-ordinates data 211. Based on the comparison, if the shift in the location points is greater than a predefined shift threshold, then the determining module 237 nay understand that the predefined appearance model is not fitted accurately to the eyes and face of the vehicle user 102 in the current time frame. In an embodiment, the predefined shift threshold may be defined as per requirements. Therefore, the determining module 237 may discard the location points determined in the current time frame and retrieve the location points of one of the plurality of previous time frames from the co-ordinates data 211 for use in the current time frame. Based on the comparison, if the shift in the location points is less than the predefined shift threshold, then the determining module 237 may understand that the predefined appearance model is fitted accurately to the eyes and face of the vehicle user 102 in the current time frame. Therefore, the determining module 237 uses the location points determined in the current time frame.

In some embodiments, upon determining the location points in the current time frame, the image capturing module 236 may capture one or more current images of the vehicle user 102 in the current time frame using the image capturing device 104. The one or more current images may be related to the eyes and the face of the vehicle user 102. Upon capturing the one or more current images, the receiving module 239 may receive the one or more current images of the vehicle user 102 from the image capturing device 104. The one or more current images are stored as the image data 209.

In some embodiments, the data extraction module 241 may extract one or more eye closure parameters from the one or more current images in real-time. As an example, the one or more eye closure parameters may include, but not limited to, a distance between the upper eye lash and the eyebrow of the vehicle user 102 in the current time frame and distance between lower eye lash and the eyebrow of the vehicle user 102 in the current time frame. The one or more eye closure parameters are stored as the eye, closure parameter data 212. Upon extracting the one or more eye closure parameters, the determining module 237 may determine the eye closure ratio using the one or more eye closure parameters and the profile of the vehicle user 102 as shown in the below Equation 1a.

$$\text{Eye closure ratio} = (Y-X)/(Y-Z) \qquad \text{Equation 1a}$$

In the above Equation 1a:
X indicates distance between the upper eye lash and the eyebrow of the vehicle user 102 in the current time frame;
Y indicates maximum distance between the upper eye lash and the eyebrow retrieved from the profile of the vehicle user 102 at a state when the eye is completely closed; and
Z indicates minimum distance between the upper eye lash and the eyebrow retrieved from the profile of the vehicle user 102 at a state when the eye is completely open.

In some embodiments, the determining module 237 may determine the eye closure ratio using Equation 1b as well.

$$\text{Eye closure ratio} = (X-P)/(Y-Z) \qquad \text{Equation 1b}$$

In the above Equation 1b:
X indicates distance between the upper eye lash and the eyebrow of the vehicle user 102 in the current time frame;
P indicates distance between the lower eye lash and the eyebrow of the vehicle user 102 in the current time frame;
Y indicates maximum distance between the upper eye lash and the eyebrow retrieved from the profile of the vehicle user 102 at a state when the eye is completely closed; and
Z indicates minimum distance between the upper eye lash and the eyebrow retrieved from the profile of the vehicle user 102 at a state when the eye is completely open.

In some embodiments, the eye closure ratio determined using the Equation 1a and Equation 1b is independent of factors such as ethnicity of the vehicle user 102, gender of the vehicle user 102 and other differences that may occur from one individual to another.

Further, the data extraction module 241 may extract one or more normalization parameters from the one or more current images in real-time. As an example, the one or more normalization parameters may include, but not limited to, width of the face in the current time frame, height of the face in the current time frame and distance between the face and the image capturing device 104 in the current time frame. In some embodiment, the one or more normalization parameters are stored as the normalization data 213.

In some embodiments, the normalization module 243 may normalize the eye closure ratio of the vehicle user 102 in the current time frame using the one or more normalization parameters and the profile of the vehicle user 102 as shown in the below Equation 2.

$$\text{Normalized eye closure ratio} = \text{Eye closure ratio} * \text{Scaling factor} \qquad \text{Equation 2}$$

In the above Equation 2, the normalization module 243 may normalize the eye closure ratio by multiplying the eye closure ratio determined in Equation 1a or Equation 1b with the scaling factor determined in real-time. The scaling factor is a normalization value that eliminates one or more errors in determining the eye closure ratio due to movement of the vehicle user 102 while driving the vehicle 102. In some embodiments, the determination module 237 may determine the scaling factor using one of the two methods as explained below.

Method 1:
In this method, the determination module 237 may determine the scaling factor using the one or more normalization parameters as shown in the below Equation 3.

$$\text{Scaling factor} = (W/AW)*(H/AH) \qquad \text{Equation 3}$$

In the above Equation 3,
W indicates width of the face in the current time frame;
H indicates height of the face in the current time frame;
AW indicates average a width of the face retrieved from the profile of the vehicle user 102; and
AH indicates average height of the face retrieved from the profile of the vehicle user 102.

Method 2;
In this method, the determination module 237 may determine the scaling factor using the one or more normalization parameters as shorn in the below Equation 4.

$$\text{Scaling factor} = D_1/D_2 \qquad \text{Equation 4}$$

In the above Equation 4,
$D_1$ indicates distance between the face and the image capturing device 104 retrieved from the profile of the vehicle user 102; and
$D_2$ indicates distance between the face and the image capturing device 104 in the current time frame.

In some embodiments, the determining module 237 may determine a Percentage Eye Closure (PEC) value of the vehicle user 102 in the current time frame using the normalized eye closure ratio. The determining module 237 may initially determine an intermediate PEC value of the vehicle Laser 102 in the current time frame using the below Equation 5.

$$\text{Intermediate PEC value} = \text{Normalized eye closure ratio} * 100 \qquad \text{Equation 5}$$

Upon determining the intermediate-PEC value of the vehicle user 102 in the current time frame, the comparison module 238 compares the intermediate-PEC value with a dynamically predicted PEC value based on the historical data 215. In some embodiments, the historical data 215 may include data related to the plurality of previous time frames. As an example, the data related to the plurality of previous time frames may include, but not limited to, intermediate-PEC values of the vehicle user 102 in the plurality of previous time frames and PEC values of the vehicle user 102 in the plurality of previous time frames. in some embodiments, the dynamically predicted PEC value indicates what the PEC value of the current frame should be by analysing the historical data 215. The determining module 237 allocates the intermediate-PEC value as the PEC value of the vehicle user 102 in the current time frame if deviation between the intermediate-PEC value and the dynamically predicted PEC value is within a predefined range. In an embodiment, the predefined range may be defined as per requirement. However, if the deviation between the intermediate-PEC value and the dynamically predicted PEC value does not lie within the predefined range, the determining module 237 allocates the dynamically predicted PEC value as the PEC value of the vehicle user 102 in the current time frame.

Figure 2B:
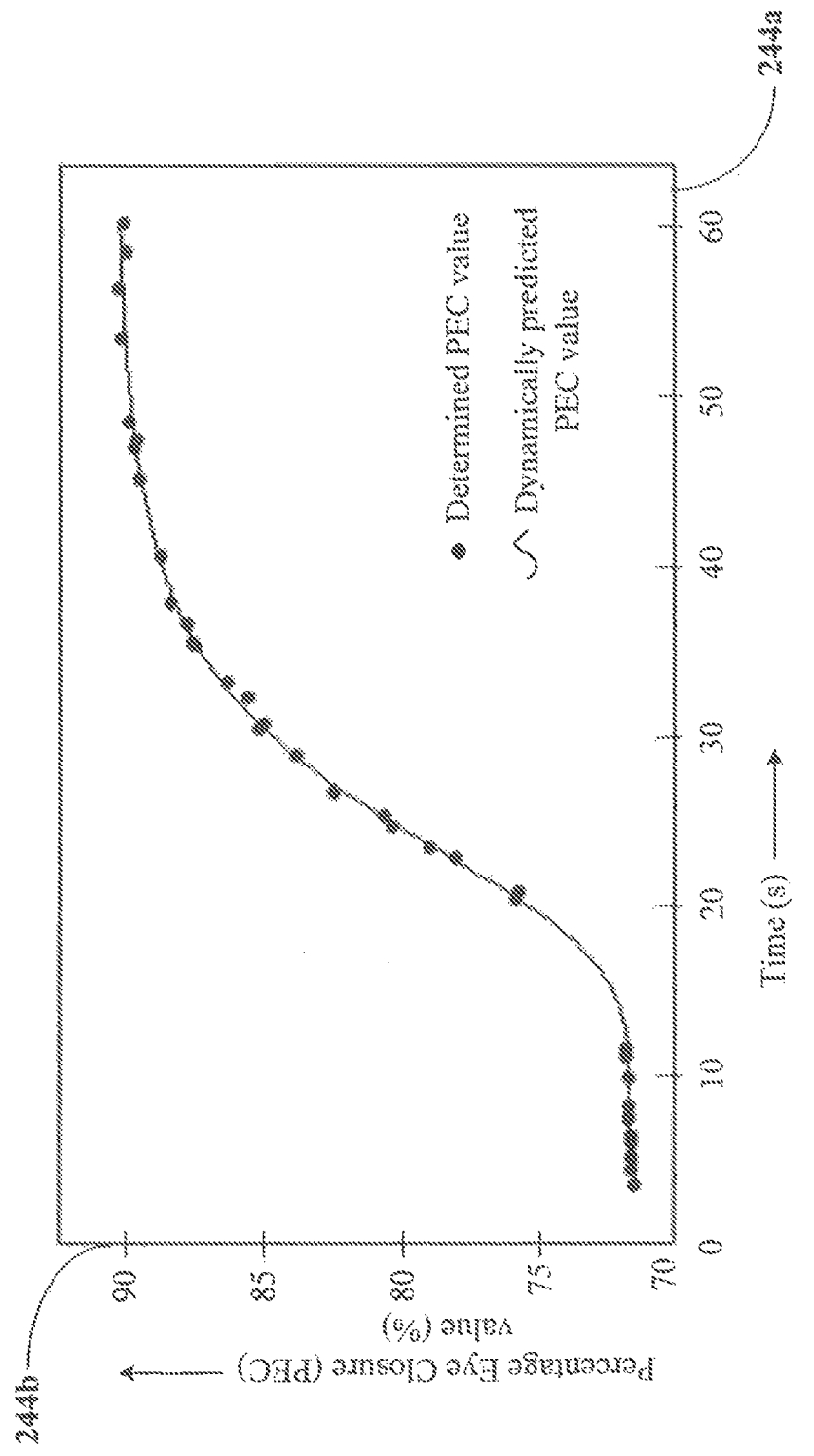
FIG. 2B shows an exemplary graphical representation of Percentage Eye Closure Values for detecting drowsiness state of a vehicle user in accordance with some embodiments of the present disclosure.

In some embodiments, the PEC value of the current time frame and the PEC values of the plurality of previous time frames may be plotted in a visual format, for example, a graph as shown in the FIG. 2B. In some embodiments, the plurality of previous time frames may be the time frames that have elapsed prior to the current time frame. Further, the PEC values of the plurality of previous time frames may be the values that are determined prior to determination of the PEC value in the current time frame. In the FIG. 2B, X-axis 244a of the graph indicates time frames of the PEC value and Y-axis 244b of the graph indicates the PEC value determined for the vehicle user 102 at a particular time frame. In some embodiments, dots in FIG. 2B indicate the exact PEC value of the vehicle user 102 at respective time frames and curve in the FIG. 2B indicates the dynamically predicted PEC value of the vehicle user 102 at the respective time frames.

In some embodiments, the drowsiness detection module 245 detects drowsiness state of the vehicle user 102 based on the PEC value of the vehicle user 102 in the current time frame and the PEC values of the vehicle user 102 in the plurality of previous time frames. To detect the drowsiness state of the vehicle user 102, the comparison module 238 compares the PEC value of the vehicle user 102 in the current time frame and the PEC values of the vehicle user 102 in the plurality of previous time frames with a predefined threshold using, but not limited to, one of two drowsiness detection methods as explained below. In an embodiment, the predefined threshold may be defined as per requirement.

Drowsiness Detection Method-1:

This method may also be referred as a voting based method. In this method, the comparison module 238 compares the PEC value of the vehicle user 102 in the current time frame and each PEC value of the vehicle user 102 in the plurality of previous time frames with the predefined threshold. A result corresponding to the comparison is recorded for the current time frame and each of the plurality of previous time frames. The drowsiness detection module 245 analyses the result to detect the drowsiness state of the vehicle user 102. Based on the analysis, if the result of majority of the time frames is greater than the predefined threshold, the drowsiness detection module 245 may detect the drowsiness state of the vehicle user 102 as "drowsy". However, if the result of majority of the time frames is less than the predefined threshold, the drowsiness detection module 245 may detect the drowsiness state of the vehicle user 102 as "not drowsy".

Drowsiness Detection Method-2:

This method may also be referred as an average window method. In this method, the determining module 237 may determine an average PEC value using the PEC value of the vehicle user 102 in the current time frame and each PEC value of the vehicle user 102 in the plurality of previous time frames. Upon determining the average PEC value, the comparison module 238 may compare the average PEC with the predefined threshold. If the average PEC value is greater than the predefined threshold, the drowsiness detection module 245 may detect the drowsiness state of the vehicle user 102 as "drowsy". However, if the average PEC value is less than the predefined threshold, the drowsiness detection module 245 may detect the drowsiness state of the vehicle user 102 as "not drowsy".

In some embodiments, if the drowsiness state of the vehicle user 102 is detected to be "drowsy", plotting the PEC values on the graph may result in a smooth curve.

In some embodiments, the notification detection module 247 may notify the drowsiness state of the vehicle user 102 to one or more end users. As an example, the notification may be in the form of an alarm, a message, a visual indication, a haptic indication and the like. As an example, the one or more end users may be owner of the vehicle 101, employer of the vehicle user 102 and the like. In some embodiments, the notification may be provided at each time frame by detecting the drowsiness state at each time frame. In some embodiments, the notification may be provided at a predefined time interval by detecting the drowsiness state for the time frames that come within the predefined time interval. In one embodiment, the notification may be provided to a vehicle safety system for taking an appropriate action. As an example, the vehicle safety system may be an auto parking system and the like. When the vehicle safety system receives the notification from the drowsiness detection system 107, the vehicle safety system may park the vehicle 101 adjacent to a road before turning off ignition of the vehicle 101.

Figure 3:
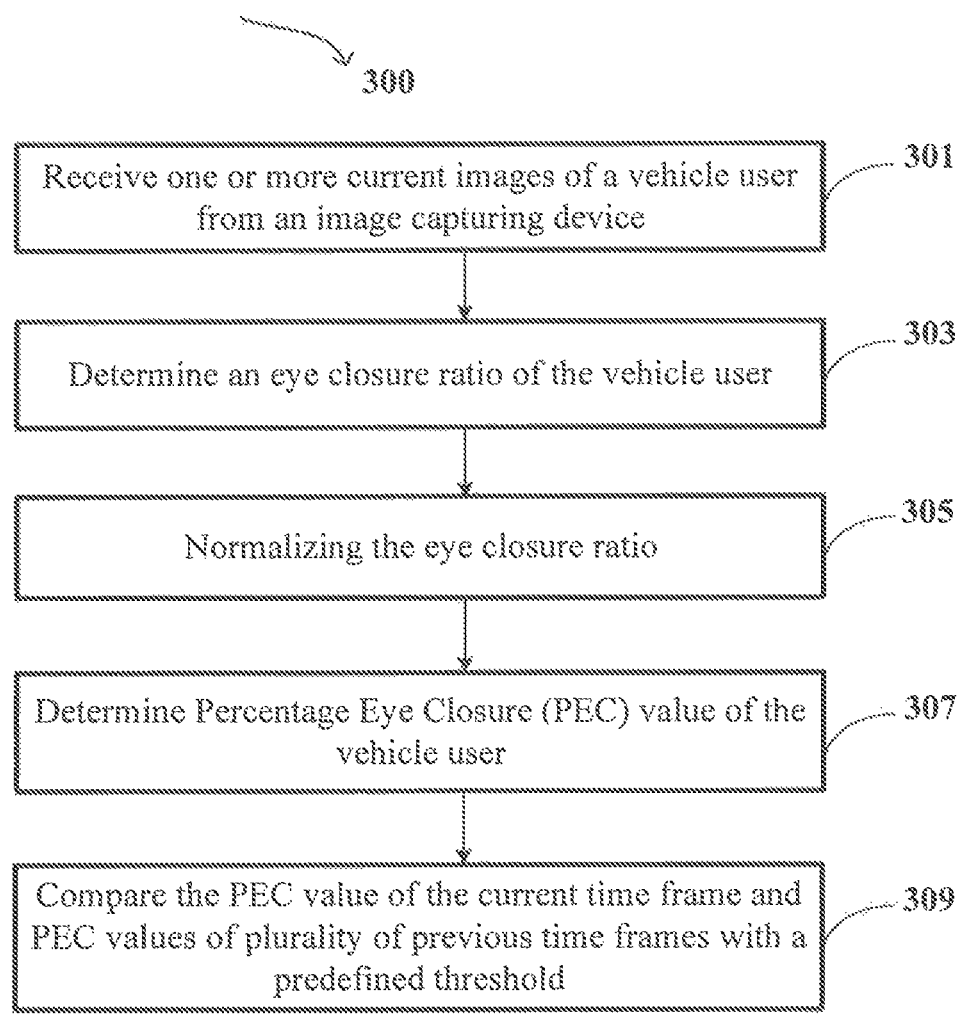
FIG. 3 shows a flowchart illustrating a method for detecting drowsiness state of a vehicle user in accordance with some embodiments of the present disclosure.

FIG. 3 shows a flowchart illustrating a method for detecting drowsiness state of the vehicle user in accordance with some embodiments of the present disclosure.

As illustrated in FIG. 3, the method 300 includes one or more blocks illustrating a method for detecting drowsiness state of the vehicle user 102. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 includes receiving, by a processor 109 of the drowsiness detection system 107, one or more current images of the vehicle user 102 in a current time frame. In some embodiments, the one or more current images are received from an image capturing device 104 associated with the drowsiness detection system 107.

At block 303, the method 300 includes determining by the processor 109, an eye closure ratio of the vehicle user 102 in the current time frame using one or more eye closure parameters and a profile of the vehicle user 102 received from a user profile database 115 associated with the drowsiness detection system 107. The eye closure ratio indicates ratio of eye closure of the vehicle user 102 in the current time frame with eye closure of the vehicle user 102 retrieved from the user profile database 115 at a state when the eye is completely closed. In some embodiments, the one or more eye closure parameters are extracted by the processor 109 from the one or more current images in rear-time. As an example, the one or more eye closure parameters may include, but not limited to, distance between upper eye lash and eyebrow of the vehicle user 102 in the current time frame and distance between lower eye lash and the eyebrow of the vehicle user 102 in the current time frame.

At block 305, the method 300 includes, normalizing by the processor 109, the eye closure ratio using a scaling factor computed in real-time. In some embodiments, the scaling factor is computed using one or more normalizing parameters extracted from the one or more current images in real-time and the profile of the vehicle user 102. As an example, the one or more normalization parameters may include, but not limited to, width of face of the vehicle user 102 in the current time frame, height of the face in the current time frame and distance between the face and the image capturing device 104 in the current time frame.

At block 307, the method 300 includes, determining by the processor 109, a Percentage Eye Closure (PEC) value of the vehicle user 102 in the current time frame using the normalized closure ratio of the vehicle user 102. The processor 109 determines an intermediate-PEC value initially using the normalized eye closure ratio. Further, the processor 109 compares the intermediate-PEC value with a dynamically predicted PEC value. The processor 109 allocates the intermediate-PEC value as the PEC value of the vehicle user 102 in the current time frame if deviation between the intermediate-PEC value and the dynamically predicted PEC value is within a predefined range. However, if the deviation between the intermediate-PEC value and the dynamically predicted PEC value does not lie within the predefined range, the processor 109 allocates the dynamically predicted PEC value as the PEC value of the vehicle user 102 in the current time frame.

At block 309, the method 300 includes, comparing by the processor 109, the PEC value of the current time frame and PEC values of plurality o previous time frames with a predefined threshold to detect drowsiness state of the vehicle user 102. In some embodiments, the processor 109 may detect the drowsiness state of the vehicle user 102 using methods such as voting based method, moving average method and the like. Upon detecting the drowsiness state of the vehicle user 102, the processor 109 notifies the drowsiness state to one or more end users.

Figure 4:
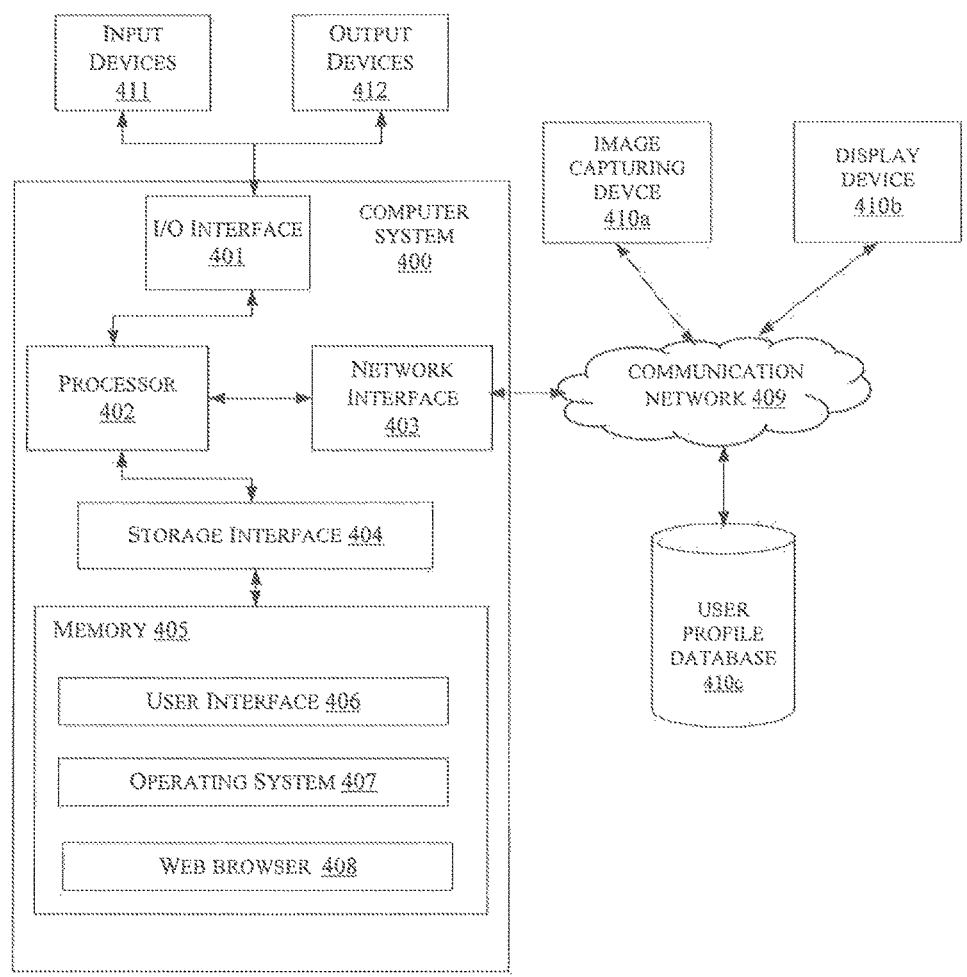
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be drowsiness detection system 107 that is used for detecting drowsiness state of the vehicle user 102. The computer system 400 may include a central processing unit ("CPU" or "processor") 402. The process 402 may include at least one data processor for executing program components for executing user- or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WIMax, or the like), etc.

Using the I/O interface 401, computer system 400 nay communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/internet Protocol (TCP/IP), token ring, IEEE 802.11 a/b/g/n/x, etc. Using the network interface 403 and the communication network 409, the computer system 400 may communicate with an image capturing unit 410a, a display device 410b and a user profile database 410c. The communication network 409 can be implemented as one of the different types of networks, such as intranet or Local Area Network (LAN) and such within the organization. The communication network 409 may either be a dedicated network or a shared network which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc, not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 405 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e,g., Red Hat, Ubantu Kubuntu, etc.), International Business Machines (IBM) OS/2, Microsoft Windows (XP, Vista/ 7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX., America National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides for detecting drowsiness state of a vehicle user.

The present disclosure provides a feature wherein eye closure ratio is detected based on eye parameters and face parameters that are computed thy each vehicle user. Therefore, the present disclosure is independent of factors such as ethnicity of the vehicle user, gender of the vehicle user and other differences that may occur from one individual to another.

The present disclosure provides a feature wherein one or more errors that occur while determining the eye closure ratio due to movement of the vehicle user while driving the vehicle are eliminated by a normalization process. Thus, achieving an increase in accuracy of detecting drowsiness state of the vehicle user and reducing false alarms.

The present disclosure provides a feature wherein once the profile of the vehicle user is created, the drowsiness detection system recognizes the vehicle user and retrieves the profile from the user profile database whenever the vehicle user uses the vehicle. Therefore, freshly recording eye and face parameters of the vehicle user is not required whenever the vehicle user uses the vehicle.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/ article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for detecting drowsiness state of a vehicle user. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items, it must also be noted that as used herein and in the appended claims, the singular forms "a," "an," and the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 101 | Vehicle |
| 102 | Vehicle user |
| 103 | Display device |
| 104 | Image capturing device |
| 107 | Drowsiness detection system |
| 109 | Processor |
| 111 | I/O interface |
| 113 | Memory |
| 115 | User profile database |
| 203 | Data |
| 205 | Modules |
| 207 | Profile data |
| 209 | Image data |
| 211 | Co-ordinates data |
| 212 | Eye closure parameter data |
| 213 | Normalization data |
| 215 | Historical data |
| 219 | Other data |
| 233 | Authentication module |
| 235 | Profile creation module |
| 236 | Image capturing module |
| 237 | Determining module |
| 238 | Comparison module |
| 239 | Receiving module |
| 241 | Data extraction module |
| 243 | Normalization module |
| 244a | X-axis indicating time frames of PEC values |
| 244b | Y-axis indicating PEC values |
| 245 | Drowsiness detection module |
| 247 | Notification module |
| 249 | Other modules |

What is claimed is:

1. A method for detecting drowsiness state of a vehicle user, the method comprising:
   receiving, by a drowsiness detection system, one or more current images of the vehicle user from an image capturing device associated with the drowsiness detection system in a current time frame;
   determining, by the drowsiness detection system, an eye closure ratio of the vehicle user in the current time frame using one or more eye closure parameters extracted from the one or more current images in real-time, and a profile of the vehicle user received from a user profile database associated with the drowsiness detection system;
   normalizing, by the drowsiness detection system, the eye closure ratio using a scaling factor computed in real-time, wherein the scaling factor is computed using one or more normalizing parameters extracted from the one or more current images in real-time and the profile of the vehicle user;
   determining, by the drowsiness detection system, a Percentage Eye Closure (PEC) value of the vehicle user in the current time frame using the normalized eye closure ratio of the vehicle user; and
   comparing, by the drowsiness detection system, the PEC value of the current time frame and PEC values of plurality of previous time frames with a predefined threshold to detect drowsiness state of the vehicle user.

2. The method as claimed in claim 1, wherein the PEC value of each of the previous time frames is determined by reiterating the steps of determining the eye closure ratio, normalizing the eye closure ratio and determining the PEC value for each of the plurality of previous time frames.

3. The method as claimed in claim 1 further comprising notifying, by the drowsiness detection system, the drowsiness state of the vehicle user to one or more end users.

4. The method as claimed in claim 1, wherein the profile of the vehicle user is created by:
   capturing, by the drowsiness detection system, one or more images of eyes and face of the vehicle user using the image capturing device, wherein the vehicle user is in a stationary position;
   extracting, by the drowsiness detection system, plurality of eye parameters and plurality of face parameters from the one or more images;
   creating, by the drowsiness detection system, the profile of the vehicle user comprising the plurality of eye parameters and the plurality of face parameters; and
   storing, by the drowsiness detection system, the profile of the vehicle user in the user profile database.

5. The method as claimed in claim 4, wherein the plurality of eye parameters comprises average height of an eye, average width of the eye, maximum distance between upper eye lash and eyebrow of the vehicle user, and minimum distance between upper eye lash and eyebrow of the vehicle user.

6. The method as claimed in claim 4, wherein the plurality of face parameters comprises average height of the face, average width of the face, location of the eye on the face, and distance of the face from the image capturing device.

7. The method as claimed in claim 1, wherein the one or more eye closure parameters comprises distance between upper eye lash and eyebrow of the vehicle user in the current time frame and distance between lower eye lash and the eyebrow of the vehicle user in the current time frame.

8. The method as claimed in claim 1, wherein the one or more normalization parameters comprises width of face of the vehicle user in the current time frame, height of the face in the current time frame, and distance between the face and the image capturing device in the current time frame.

9. The method as claimed in claim 1, wherein determining the PEC value comprises:
   determining, by the drowsiness detection system, an intermediate-PEC value using the normalized eye closure ratio in the current time frame;
   comparing, by the drowsiness detection system, the intermediate-PEC value with a dynamically predicted PEC value based on historical data; and
   allocating, by the drowsiness detection system, the intermediate-PEC value as the PEC value if deviation between the intermediate-PEC value and the dynamically predicted PEC value is within a predefined range.

10. The method as claimed in claim 9, further comprising allocating, by the drowsiness detection system, the dynamically predicted PEC value as the PEC value if the deviation between the intermediate-PEC value and the dynamically predicted PEC value exceeds the predefined range.

11. A drowsiness detection system for detecting drowsiness state of a vehicle user, the drowsiness detection system comprising:
- a processor; and
- a memory communicatively coupled to the processor, wherein the memory stores the processor-executable instructions, which, on execution, causes the processor to:
- receive one or more current images of the vehicle user from an image capturing device associated with the drowsiness detection system in a current time frame;
- determine an eye closure ratio of the vehicle user in the current time frame using one or more eye closure parameters extracted from the one or more current images in real-time and a profile of the vehicle user received from a user profile database associated with the drowsiness detection system;
- normalize the eye closure ratio using a scaling factor computed in real-time, wherein the scaling factor is computed using one or more normalizing parameters extracted from the one or more current images in real-time and the profile of the vehicle user;
- determine a Percentage Eye Closure (PEC) value of the vehicle user in the current time frame using the normalized eye closure ratio of the vehicle user; and
- compare the PEC value of the current time frame and PEC values of plurality of previous time frames with a predefined threshold to detect drowsiness state of the vehicle user.

12. The drowsiness detection system as claimed in claim 11, wherein the processor determines the PEC values of each of the plurality of previous time frames by reiterating the steps of determining the eye closure ratio, normalizing the eye closure ratio, and determining the PEC value for each of the plurality of previous time frames.

13. The drowsiness detection system as claimed in claim 11, wherein the processor further notifies to one or more end users, the drowsiness state of the vehicle user.

14. The drowsiness detection system as claimed in claim 11, wherein to create the profile of the vehicle user, the instructions cause the processor to:
- capture one or more images of eyes and face of the vehicle user using the image capturing device, wherein the vehicle user is in a stationary position;
- extract plurality of eye parameters and plurality of face parameters from the one or more images;
- create the profile of the vehicle user comprising the plurality of eye parameters and the plurality of face parameters; and
- store the profile of the vehicle user in the user profile database.

15. The drowsiness detection system as claimed in claim 14, wherein the plurality of eye parameters comprises average height of an eye, average width of the eye, maximum distance between upper eye lash and eyebrow of the vehicle user, and minimum distance between upper eye lash and eyebrow of the vehicle user.

16. The drowsiness detection system as claimed in claim 14, wherein the plurality of face parameters comprises average height of the face, average width of the face, location of the eye on the face, and distance of the face from the image capturing device.

17. The drowsiness detection system as claimed in claim 11, wherein the one or more eye closure parameters comprises distance between upper eye lash and eyebrow of the vehicle user in the current time frame, and distance between lower eye lash and the eyebrow of the vehicle user in the current time frame.

18. The drowsiness detection system as claimed in claim 11, wherein the one or more normalization parameters comprises width of face of the vehicle user in the current time frame, height of the face in the current time frame, and distance between the face and the image capturing device in the current time frame.

19. The drowsiness detection system as claimed in claim 11, wherein to determine the PEC value, the instructions cause the processor to:
- determine an intermediate-PEC value using the normalized eye closure ratio in the current time frame;
- compare the intermediate-PEC value with a dynamically predicted PEC value based on historical data; and
- allocate the intermediate-PEC value as the PEC value if deviation between the intermediate-PEC value and the dynamically predicted PEC value is within a predefined range.

20. A non-transitory computer readable medium including instructions stored thereon that when processed by at least one processor causes a drowsiness detection system to perform operations comprising:
- receiving one or more current images of a vehicle user from an image capturing device associated with the drowsiness detection system in a current time frame;
- determining an eye closure ratio of the vehicle user in the current time frame using one or more eye closure parameters extracted from the one or more current images in real-time and a profile of the vehicle user received from a user profile database associated with the drowsiness detection system;
- normalizing the eye closure ratio using a scaling factor computed in real-time, wherein the scaling factor is computed using one or more normalizing parameters extracted from the one or more current images in real-time and the profile of the vehicle user;
- determining a Percentage Eye Closure (PEC) value of the vehicle user in the current time frame using the normalized eye closure ratio of the vehicle user; and
- comparing the PEC value of the current time frame and PEC values of plurality of previous time frames with a predefined threshold to detect drowsiness state of the vehicle user.

* * * * *